No. 607,123. Patented July 12, 1898.
J. L. McVAY.
HOOK.
(Application filed May 18, 1897.)
(No Model.)

Witnesses
Franck L. Ourand
Albert Popkins

Inventor
Jennie L. McVay.
By W. S. Boyd, Attorney

UNITED STATES PATENT OFFICE.

JENNIE L. McVAY, OF WINONA, MINNESOTA.

HOOK.

SPECIFICATION forming part of Letters Patent No. 607,123, dated July 12, 1898.

Application filed May 18, 1897. Serial No. 637,066. (No model.)

*To all whom it may concern:*

Be it known that I, JENNIE L. MCVAY, a citizen of the United States, residing at Winona, in the county of Winona and State of Minnesota, have invented certain new and useful Improvements in Hooks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to hooks or pins for connecting two articles together, and has for its object to produce such a device as will be simple, cheap, and effective and which can be secured to or disconnected from the articles; and it consists in the novel features of the same, as will be hereinafter more particularly set forth.

Figure 1:
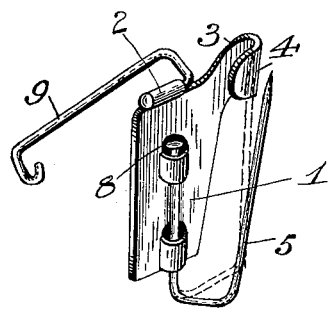
Figure 2:
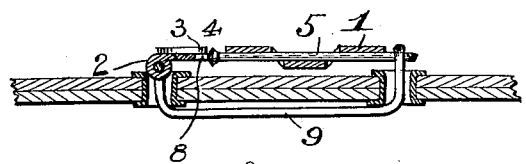
Figure 3:

Referring to the accompanying drawings, in which the same reference-numeral indicates a corresponding part in each of the views in which it occurs, Figure 1 is a perspective view of a hook or pin embodying my invention. Fig. 2 is a longitudinal sectional view of the same, and Fig. 3 illustrates one manner of utilizing the invention.

In the drawings, 1 indicates a base or support which is preferably formed from a thin plate of metal, one end of which is provided with a closed eye 2 and a lateral projection 3, the end of which is bent or folded over into a hook 4. Rotatively secured to the central portion of the plate is a pin 5, formed into a substantially U-shaped hook, the free end of which is adapted to be slipped under the hook 4 in the nature of a safety-pin. When secured in this manner, the pin will lie flat with the plate and not show through the clothing. This pin may be secured to the plate in any desired manner; but I have found a very convenient and effective means to be by stamping portions of the plate in opposite directions, as shown at 6 and 7, and passing the pin longitudinally between the stamped portions and letting the head of the pin rest in a perforation 8 near one end of the plate. This will permit of the pin being rotated axially, so as to permit of the point being placed under the hook or swung out at an angle to the plate for the reception of belts, bands, or other portions of the garment which it is desired to secure by means of the pin. The head will prevent the longitudinal movement of the pin in either direction by engaging with the walls of the perforation. Instead of stamping the plate in opposite directions it is evident that only a portion of it need to be stamped in one direction, thereby throwing the thickness of the pin entirely upon one side of the plate, or any other suitable means might be provided for connecting the pin with the plate.

For the purpose of securing the plate to another part of the garment I provide a fastener 9, each end of which is bent at substantially a right angle to the main portion, and one end is provided with a head and is bent laterally, so as to be pivotally secured within the eye 2 at the end of the plate, and the opposite end is formed into a hook which is adapted to be bent over a portion of the pin 5, which projects beyond the end of the plate. As the eye 2 is at substantially right angles to the headed portion of the pin 5, the fastener swings in a plane that cuts the plane of the plate longitudinally at substantially right angles.

In using my improved hook the garment or portion thereof to which the hook is to be applied is provided with eyelets or other suitable holes through which the free end of the fastener 9 is passed and which will cause the face of the plate to be securely held against the garment. After the free end of the fastener has been passed through the second eyelet and its hooked end made to engage with the projecting portion of the pin 5 the sharp-pointed portion of the pin 5 is passed through the garment to be connected by means of the hook, and the main portion of the pin is rotated to cause the free end thereof to lie in the plane of the plate or base and be passed under the hook 4.

If desired, the plate may be provided with perforations or holes, by means of which it may be sewed to one portion of the garment in such position to permit of the pin engaging with the other portion of the garment.

Although the hook may be used for any desired purpose, I find it very convenient when used in connection with my improvements in waists or corsets for which I received a patent, No. 580,419, April 13, 1897. When used in connection with this waist, the fastener 9 is passed through holes or eyelets in the lower end of the projections of said waist, which will cause the plate and pin 5 to stand substantially in a vertical position. After having secured the plate to the waist in this manner the skirt or any other portion of the garments may be passed over the pin 5 or between it and the plate, and the free end of the pin may then be passed under the hook 4, which will thus cause the entire weight of the garment to be supported by the bottom or bent portion of the pin, and as the hook is supported directly from the shoulder by means of the waist the entire weight of the supported garment is carried by the shoulders instead of the hips, which is a very desirable consideration.

Another advantage secured by the use of my hook is that it may be removed from the garment when it is desired to wash the garment, thereby preventing any damage to the hook or discoloration of the garment by the rust or other chemical action which might take place by the introduction of the metal into the wash.

Having thus described my invention, what I claim is—

1. The combination with a base or support provided with a shield, of a hook pivotally secured to the base, the free end of which is adapted to be secured in the shield, and a hook-shaped fastener pivotally secured to the base in position to hold the hook in a vertical position when secured to a garment, and means for locking the fastener, substantially as set forth.

2. The combination, with a base or support, provided with a shield, of two hooks pivotally secured to the base, the free end of one of which is adapted to be secured in the shield, and the free end of the other is adapted to engage with the first-mentioned hook, substantially as set forth.

3. The combination, with a base or support, one end of which is provided with an eye and a shield, of two hooks, one of which is permanently secured in the eye and the free end of the other one is adapted to be secured in the shield, substantially as set forth.

4. The combination, with a base or plate, one end of which is provided with an eye and a shield and the central portion is stamped out of the plane of the plate to form a bearing for a pin, of a pin swiveled longitudinally in said stamped portion with its free end adapted to enter the shield, and an angularly-bent pin pivotally secured in the eye with its free end adapted to engage with the other pin, substantially as set forth.

In testimony whereof I affix my signature in presence of two witnesses.

JENNIE L. McVAY.

Witnesses:
ALEX ROEBLING,
H. E. HOPLEY.